(12) United States Patent
Nakata et al.

(10) Patent No.: US 6,489,559 B2
(45) Date of Patent: Dec. 3, 2002

(54) GROMMET

(75) Inventors: Hiroyuki Nakata, Yokkaichi (JP); Takeshi Hashimoto, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/942,170

(22) Filed: Aug. 29, 2001

(65) Prior Publication Data

US 2002/0038715 A1 Apr. 4, 2002

(30) Foreign Application Priority Data

Sep. 29, 2000 (JP) ........................................ 2000-300679
Sep. 29, 2000 (JP) ........................................ 2000-300712

(51) Int. Cl.[7] ................................................ H02G 3/18
(52) U.S. Cl. .................. 174/65 G; 174/65 R; 174/135; 16/2.2; 248/56; 439/604
(58) Field of Search ............................ 174/65 R, 65 G, 174/152 G, 153 G, 153 R, 135, 31 R, 65 SS, 151; 16/2.1, 2.2; 248/56; 439/604, 587

(56) References Cited

U.S. PATENT DOCUMENTS

| | | | |
|---|---|---|---|
| 4,685,173 A | | 8/1987 | Pavur |
| 4,928,349 A | * | 5/1990 | Oikawa et al. ............ 16/2.1 X |
| 5,453,579 A | * | 9/1995 | Cohea ................... 174/153 G |
| 6,211,464 B1 | * | 4/2001 | Mochizuki et al. ....... 174/65 G |

FOREIGN PATENT DOCUMENTS

| | | |
|---|---|---|
| EP | 0 580 130 | 1/1994 |
| JP | 4-42982 | 4/1992 |
| JP | 9 092060 | 4/1997 |

* cited by examiner

Primary Examiner—Dean A. Reichard
Assistant Examiner—Dhiru R Patel
(74) Attorney, Agent, or Firm—Anthony J. Casella; Gerald E. Hespos

(57) ABSTRACT

A one-motion grommet (10) has opposite front and rear small-diameter tubes (11, 12) and a widened tube (13) therebetween. The front small diameter tube (11) is dimensioned to pass into a through hole (9) in a body panel (8). A cut-away portion (15) extends forward from the rear end of the widened tube (13). The widened tube (13) is branched into an outer tube (13c) and an inner tube (13d) that is continuous with the second small-diameter tube (12). Front and rear walls (16a; 16b) project from the outer circumferential surface of a portion of the outer tube (13c) located more backward than the forward end of the cut-away portion (15) and are opposed to each other to form a body locking recess (16). The front end of the cut-away portion (15) is located more radially inward than the base end of the front wall (16a), and an opening side of the cut-away portion (15) is located radially inwardly of the rear wall (16b).

17 Claims, 7 Drawing Sheets

GROMMET

BACKGROUND OF THE INVENTION

1. Field of the Invention

The present invention relates to a grommet and particularly to a grommet that can be assembled onto a wiring harness and mounted in a through hole in a body panel of an automotive vehicle. The grommet protects the wiring harness and makes a portion where the wiring harness introduced into the through hole waterproof, dustproof and soundproof.

2. Description of the Related Art

A grommet typically is mounted on a wiring harness that will extend from an engine compartment to a passenger compartment of an automotive vehicle. The grommet and the wiring harness than are mounted in a through hole of a body panel that partitions the engine compartment from the passenger compartment. Accordingly, the grommet protects the wiring harness at the through hole and prevents the flow of water, dust and sound from the engine compartment to the passenger compartment.

A grommet of the type described above is referred to as a "one-motion grommet" and has a body-locking recess around its outer periphery. The body locking recess is configured to be engaged with the surrounding edge of a through hole of a body panel merely by pushing the grommet into the through hole in one direction. A one-motion grommet has the potential for easy mounting.

A known one-motion grommet is disclosed in Japanese Unexamined Utility Model Publication No. 4-42982 and also is identified by the numeral 1 in FIG. 10 herein. The grommet 1 has small-diameter tubes 2 and 3 at opposite ends of the grommet 1 and a widened tube 4 between the small-diameter tubes 2 and 3. A body locking recess 5 is formed in the outer circumferential surface of the widened tube 4, and a cut-away portion 6 is formed at the radially inner side of the body locking recess 5.

The grommet 1 is pushed in the direction of arrow Q from an engine compartment (X) to a passenger compartment (Y). As a result, a slanted wall 5a of the body locking recess 5 is deformed inwardly into the cut-away portion 6, and is enabled to pass through a through hole 9 formed in a body panel 8. The slanted wall 5a is restored to its original shape after passing through the through hole 9, so that the body panel 8 is locked between the slanted wall 5a and another side wall 5b.

The cut-away portion 6 extends from an opening 6a beyond a position radially inwardly of the body locking recess 5 to facilitate the inward deformation of the slanted wall 5a when the grommet 1 is being pushed into the through hole 9. The cut-away portion 6 then is bent radially outwardly beyond the body locking recess, so that a back end 6b of the cut-away portion 6 reaches substantially the same radial position as a groove bottom surface 5c of the body locking recess 5.

The base of the slant wall 5a is thinner at its outer circumference than at its inner circumference. As a result, the cut-away portion 6 is likely to cause the slanted wall 5a to deform outwardly when the body panel 8 contacts an outer circumferential surface 4a of the widened portion 4 adjacent the back end 6b of the cut-away portion 6. Deformation of the slanted wall 5a outwardly instead of inwardly will cause the slanted wall 5a to abut against a wall surface 8a of the body panel 8 at the side from which the grommet 1 is pushed, as shown in FIG. 4(B). Hence, it will be difficult to insert the grommet 1 into the through hole 9. More particularly, the cut-away portion 6 that is formed to facilitate the inward deformation of the slanted wall 5a may actually cause the slanted wall 5a to deform outwardly and in a direction opposite from the desired direction. This complicates the insertion of the grommet 1 into the through hole 9 and requires a larger insertion force.

The through hole of the body panel may be oblong. However, the small diameter tube is usually circular. As a result, the cut-away portion 6 may be large along one axis and small along a second axis. If the cut-away portion is excessively large along the longer axis, the surrounding wall where the body locking recess is formed enters the cut-away portion. Consequently, the body locking recess may pass through the through hole.

The cut-away portion is formed inside the side wall of the body locking recess to facilitate the inward deformation of the side wall of the recess. However, the side wall may be inclined excessively inwardly to cause the body locking recess to pass through the through hole both when the grommet is pushed into the through hole of the body panel, and when the grommet is pulled through the through hole. This may occur when the through hole is oblong and the widened tube portion formed with the body locking recess is circular, and when the through hole and the widened tube portion are both circular.

In view of the above problems, an object of the invention is to improve a mount ability of a grommet by causing a side wall of a body locking recess to be easily and securely deformed inwardly during insertion of a grommet into a through hole in a body panel.

SUMMARY OF THE INVENTION

The invention is directed to a grommet that is insertable into a through hole in a body panel in one direction, and that can be engaged with the through hole while mounted on a wiring harness. The grommet may be unitarily formed from a rubber or elastomer, and comprises first and second small-diameter tubes at opposite longitudinal ends of the grommet. The first small-diameter tube defines the front of the grommet with respect to the insertion direction of the grommet into the through hole, and hence the second small diameter tube defines the rear end of the grommet.

The grommet further comprises a widened tube between the first and second small-diameter tubes. The widened tube includes a cut-away portion that extends forward into the rear end of the widened tube and that opens toward the rear end of the grommet. Thus, the cut-away portion branches the widened tube into an outer tube and an inner tube. The inner tube is substantially continuous with the second small-diameter tube.

A body locking recess is defined in the outer tube. The body locking recess is more backward than the forward end of the cut-away portion along the longitudinal direction of the grommet. Additionally, the forward end of the cutaway portion preferably is more radially inward than the radially inward bottom end of the body locking recess. Thus, at least a portion of the outer tube will deform inwardly toward the cut-away portion in response to forces exerted by the body panel on the insertion side of the outer tube while the grommet is being pushed into the through hole in the body panel.

The body locking recess preferably is defined partly by front and rear projections on the outer surface of the outer tube. The front projection has a forwardly and outwardly facing slanted surface and a substantially radially aligned rearwardly facing surface that defines the forward side of the body locking recess. At least the forward end of the cut-away portion preferably is more radially inward than the slanted surface. These relative positions ensure that at least a portion of the outer tube will deform inwardly toward the cut-away portion in response to forces generated by the body panel on the slanted surface of the outer tube as the grommet is being pushed into the through hole in the body panel. Thus, unlike the above-described prior art, there is no possibility that the slanted surface of the annular front wall will deform radially outward in response to forces exerted by the body panel as the grommet is urged into the through hole. Accordingly, insertion of the grommet into the through hole is carried out smoothly.

The back end of the cut-away portion preferably has an opening side with an outer circumferential surface that is flared outwardly to widen toward the opening end of the cut-away portion. The outwardly flared surface preferably is radially inward from the annular rear wall of the outer tube. The base end of the slanted surface that contacts the body panel when the grommet is pushed into the through hole preferably is more radially outward than the back end of the cut-away portion. Accordingly, unlike the above-described prior art, there is no likelihood that the slanted surface is deformed outwardly against the body panel. Rather, the slanted wall is deformed inwardly toward the cut-away portion, thereby achieving a smoother pushing operation.

Further, the outer tube can be deformed easily toward the cut-away portion due to the widening at the back end opening of the cut-away portion. Therefore, the one-motion grommet can be mounted on the body panel with a small insertion force.

Portions of the outer tube adjacent the base end of the slanted surface preferably are thicker than portions of the inner tube substantially continuous with the second small-diameter tube. Thus, a pushing force of the body panel on the grommet first acts on the thinner inner tube to deform the inner tube when the body panel abuts against the slanted surface. The inward deformation of the inner tube then deforms the outer tube inwardly.

Portions of the inner tube branched by the cut-away portion and continuous with the second small-diameter tube are thinner than a base portion of the inner tube branched from the outer tube. Thus, when the body panel is brought into contact with the slanted surface of the projection that defines the body locking recess, the thinner portion of the inner tube first is pushed longitudinally thereby causing the thicker base portion to deform in a direction toward the center of the inner tube or radially inwardly and to cause the slanted wall of the outer tube to deform radially inwardly about the back end of the cutaway portion.

The grommet may further comprise an inclination-preventing projection on the outer circumferential surface of the inner tube along longitudinal direction to prevent the outer tube from inclining excessively. Thus, the outer tube comes into contact with the inclination-preventing projection to prevent the grommet from passing through the through hole.

The through hole of the body panel may be oblong. In this instance, the outer tube of the widened tube portion has an oblong cross section, but the inner tube through which the wiring harness is introduced has a substantially circular cross section. Thus, a clearance between the inner tube and the outer tube is widened at a longer axis side while being narrowed at a shorter axis side. Accordingly, the inclination-preventing projection is provided on the outer circumferential surface of the inner tube at the longer axis side, so that a distance between the projecting end of the inclination-preventing projection and the inner circumferential surface of the outer tube is substantially the same as a distance between the outer circumferential surface of the inner tube and the inner circumferential surface of the outer tube at the shorter axis side. Thus, the degree of deformation of the outer tube is restricted by the inclination-preventing projection to prevent the body locking recess from being deformed sufficiently inward to pass through the through hole of the body panel.

Most preferably, the inclination preventing projection projects a longer distance at the opening end of the cut-away portion.

Since the inward inclination of the outer tube is restricted, the projecting distance of the projection is made larger at a portion corresponding to an outwardly widened portion of the outer tube.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENT

Figure 1:
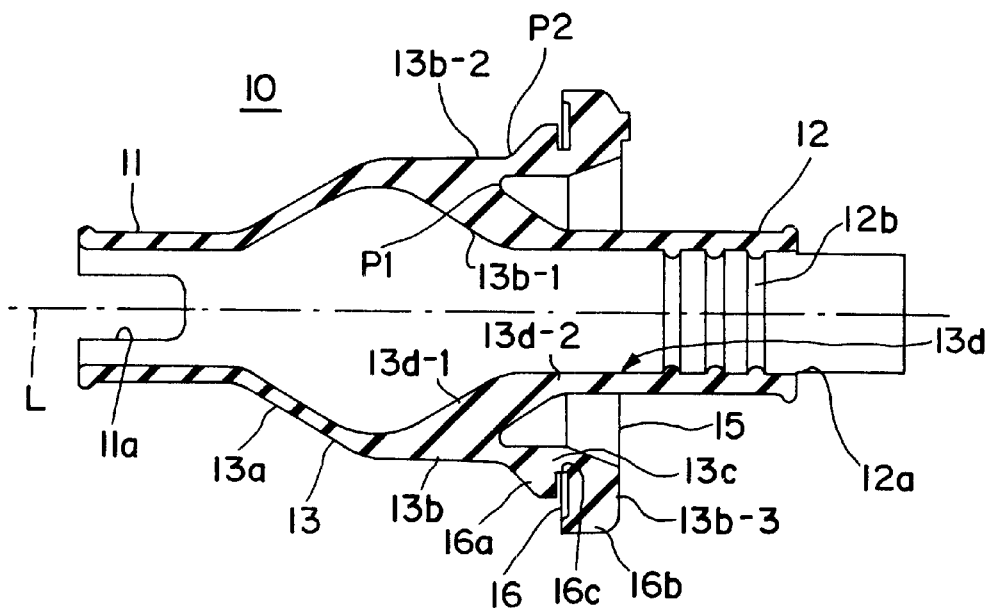
FIG. 1 is a section of a grommet according to a first embodiment of the invention.
Figure 2:
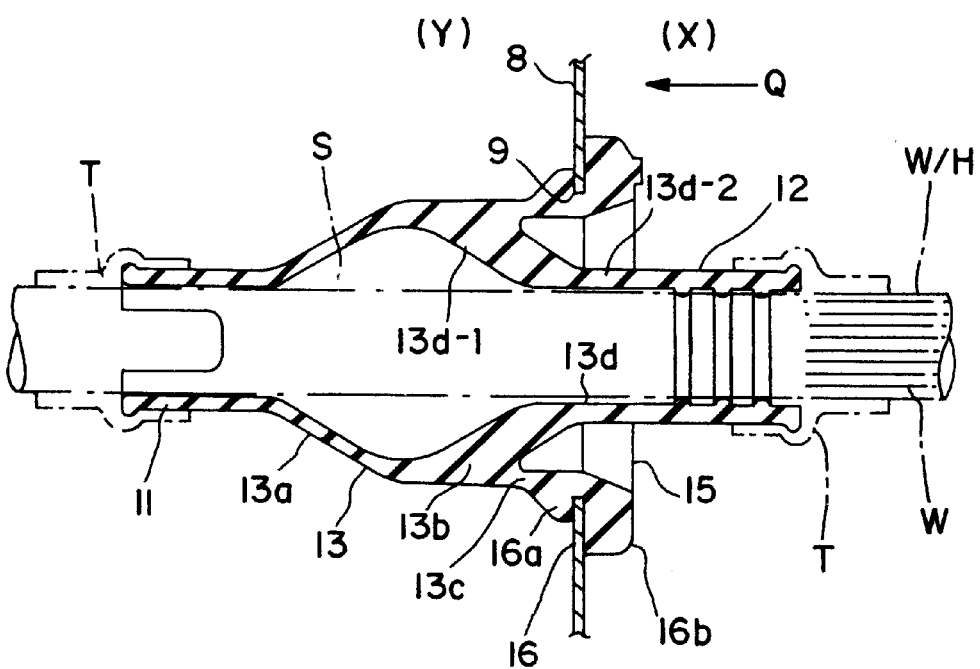
FIG. 2 is a section showing a mounted state of the grommet on a body panel.

A grommet in accordance with the invention is identified by the numeral 10 in FIGS. 1–3. The grommet 10 is formed integrally or unitarily of a resilient material, e.g. a rubber or elastomer, and has first and second small-diameter tubes 11, 12 disposed respectively at front and rear ends with respect to an insertion direction Q. The grommet 10 further has a widened tube 13 that is formed continuously between the first and second small-diameter tubes 11 and 12.

As shown in FIG. 2, a bundle of wires W of a wiring harness W/H can be introduced into the grommet 10 along a center axis L extending through the first small-diameter tube 11, the widened tube 13 and the second small-diameter tube 12. The grommet 10 can be fixed by winding a tape T with the wire bundle W held in close contact with the inner circumferential surfaces of the first and second small-diameter tubes 11, 12. A sealed sound-insulating space S is defined between the inner circumferential surface of the widened tube 13 and the wire bundle W.

The assembly of the grommet 10 and the wiring harness W/H can be pushed in the direction Q into a through hole 9 formed in a body panel 8 from a first side, e.g. an engine compartment (X). The grommet 10 then can be engaged with the periphery of the through hole 9 substantially in one motion, as explained below.

The widened tube 13 includes a generally conic portion 13a with a small diameter end that is continuous with the first small-diameter tube 11 and an opposite large diameter end. The widened tube 13 further includes a large-diameter portion 13b that is substantially continuous with the large diameter end of the conic portion 13a. The large-diameter portion 13b has an inner circumferential surface 13b-1 with a diameter that decreases toward the second small-diameter tube 12 and an outer circumferential surface 13b-2 that is cylindrical or tapered at a relatively small angle to widen its diameter toward the rear end.

The large-diameter portion 13b has a rear end surface 13b-3 formed with an annular cut-away portion 15 that is open to the rear. Thus, the cut-away portion 15 branches the large-diameter portion 13b into an outer tube 13c and an inner tube 13d. The inner tube 13d is substantially continuous with the second small-diameter tube 12.

A body locking recess 16 is formed between annular front and rear walls 16a and 16b that project from the outer circumferential surface 13b-2 of the outer tube 13b. The annular front wall 16a includes a slanted front surface that is flared to larger diameters at locations closer to the rear end of the grommet 10. Thus, the slanted front surface of the annular front wall 16a has the same tapered orientation as the conic portion 13c. The annular front wall 16a also includes a radially aligned rear surface for engaging against a surface of the body panel 8. The annular rear wall 16b includes a radially aligned front surface that faces the rear surface of the annular front wall 16a. Thus, the front surface of the annular rear wall 16b also will engage a surface of the body panel 8 when the body panel 8 is engaged in the locking recess 16. The annular rear wall 16b has a greater diameter than the annular front wall 16a, and hence projects radially beyond the annular front wall 16a. Additionally, the front surface of the annular rear wall 16b is aligned approximately with the rear end of the inner tube 13d, but the rear end of the annular rear wall 16b extends rearwardly beyond the rear end of the inner tube 13d. The locking recess 16 further includes a bottom surface 16c that extends between the front annular wall 16a and the annular rear wall 16b. The bottom surface 16c is substantially at the same radial position as the outer circumferential surface 13b-2 of the large-diameter portion 13b.

Figure 3A:
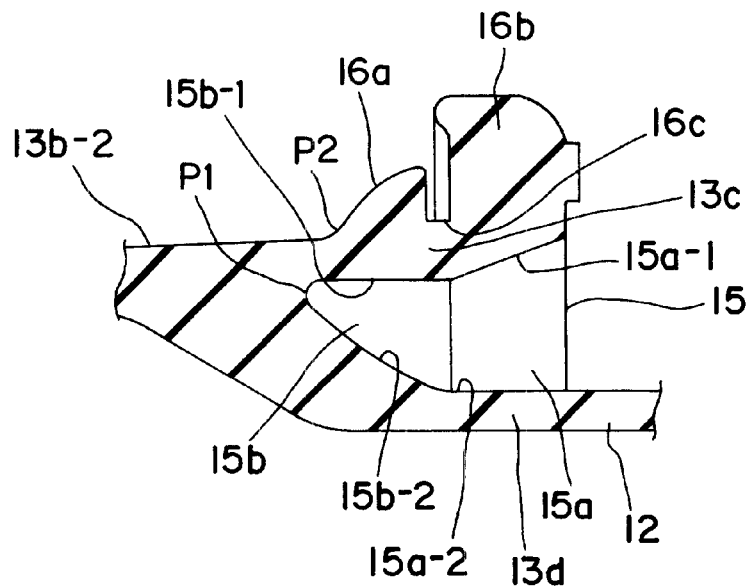
FIGS. 3(A) and 3(B) are enlarged sections showing an essential portion of the grommet.
Figure 3B:
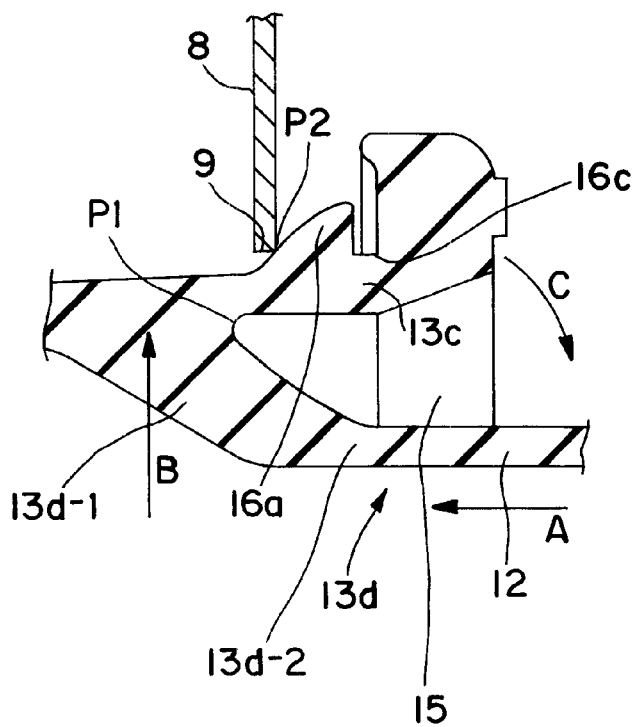

An opening end 15a of the cut-away portion 15 is located radially inwardly of the annular rear wall 16b and is defined by an inwardly and rearwardly facing, conically generated surface 15a-1 of the outer tube 13c and a substantially cylindrical outwardly facing surface 15a-2 that is substantially continuous with the outer circumferential surface of the second small-diameter tube 12. Thus, the opening side 15a has a substantially trapezoidal cross section, as shown In FIGS. 3A and 3B.

The forward and innermost end 15b of the cut-away portion 15 is radially inward of the annular front wall 16a and is defined be an inwardly-facing cylindrical surface 15b-1 of the outer tube 13c that is continuous with the conically generated surface 15a-1. The forward end 15b of the cut-away portion 15 also is defined by an outwardly and rearwardly facing conically generated surface 15b-2. Thus, the forward end 15b of the cutaway portion 15 has a substantially triangular cross section.

The front P1 of the cut-away portion 15 is located at a position radially more inward than the annular front wall 16a of the outer tube 13c. Additionally, the inner tube 13d is comprised of a thick and rearwardly slanted base portion 13d-1 that is branched off from the outer tube 13c, and a thinner portion 13d-2 that extends cylindrically from the leading end of the thicker base portion 13d-1 and is continuous with the second small-diameter tube 12. Thus, the through hole 9 of the body panel 8 may contact the slanted front surface of the annular front wall 16a in a position P2 that is located radially more outward than the cutaway portion 15 so that the outer tube 13c can be deflected easily towards the inner tube 13d.

Further, unlike the prior art, the inwardly facing surface 15b-1 of the forward end of the cut-away portion 15 is not slanted in a radially outward direction, and therefore is located more radially inward than both the bottom surface 16c of the body locking recess 16 and the position P2.

A boundary between the opening end 15a and the forward end 15b is at a longitudinal position substantially corresponding to the bottom surface 16c of the body locking recess 16, and the front P1 of the forward end 15b is located more forward than the base end position P2 of the slanted front surface of the annular front wall 16a.

The first small-diameter tube 11 is formed with a pair of large notches 11a that extend from the front end, whereas the second small-diameter tube portion 12 is formed with substantially annular ribs 12a on its inner circumferential surface.

The grommet 10 is mounted on the wiring harness W/H, as shown in FIG. 2. More particularly, the assembly of the grommet 10 and the wiring harness W/H is pushed in direction Q so that the first small diameter tube 11 enters into the through hole 9 of the body panel 8 from the first side, e.g. the engine compartment (X) to a second side, e.g. a passenger compartment (Y). The inner diameter of the through hole 9 substantially equals the outer diameter of the large-diameter portion 13b. As a result, the grommet 10 can pass easily through the through hole 9 until the large-diameter portion 13b is reached. The large-diameter portion 13b of the grommet 10 then passes through the through hole 9 in sliding contact with the inner circumferential surface of the through hole 9.

The base end P1 of the cut-away portion 15 passes through the through hole 9. Then, as shown in FIG. 3(B), the slanted front surface of the annular front wall 1 6a that projects from the outer circumferential surface of the outer tube 13c comes into contact with the body panel 8. Thus, the slanted surface of the annular front wall 16a is pushed radially inwardly. However, the annular front wall 16a is thick and is not deformed easily. Therefore, the thinner portion 13d-2 of the inner tube 13d initially is pushed in the insertion direction, as indicated by an arrow A in FIG. 3(B). As a result, the base portion 13d-1 of the inner tube 13d is deformed radially outwardly or away from the center of the inner tube 13d, as indicated by an arrow B. The deformation of the inner tube 13d causes the outer tube 13c to pivot in the direction of arrow C about the front P1 of the cut-away portion 15. As a result, the annular front wall 16a and the annular rear wall 16b that define the body locking recess 16 deform toward the cut-away portion 15. The opening end 15a of the cut-away portion 15 is wide. Consequently, the outer tube 13c is permitted to deform radially inwardly.

The outer tube 13c is deformed inwardly when the slanted front surface of the annular front wall 16a contacts the body panel 8. Additionally, the contact between body panel 8 and the slanted front surface of the annular front wall 16a causes the annular front wall 16a to pass through the through hole 9 while deforming the outer tube 13c inwardly instead of outwardly. As a result, the annular front wall 16a can pass easily through the through hole 9 with a small insertion force.

Upon passing through the through hole 9, the annular front wall 16a is restored substantially to its original shape after passing through the through hole 9 to tightly hold the body panel 8 in cooperation with the annular rear wall 16b. Thus, the grommet 10 is mounted on the body panel 8 with the inner circumferential surface of the through hole 9 held substantially in contact with the bottom surface 16c.

The grommet 10 can be locked in the through hole 9 of the body panel 8 by one pushing motion in one direction Q from the engine compartment (X).

As explained above, the cut-away portion is radially inward from the base end of the slanted front surface of the annular front wall. As a result, the outer wall is deformed inwardly upon contact with the body panel. Thus, the annular front wall moves inwardly toward the cut-away portion, and the grommet pushing operation can be performed smoothly with a small insertion force.

As explained above, the cut-away portion is widened at its opening end. Accordingly, the outer tube provided with the annular front and rear walls that form the body locking recess can be deformed easily toward the cut-away portion. Therefore, the insertion force required to mount the grommet can be reduced further.

A second embodiment of the invention is described with reference to FIGS. 4 to 8, wherein the same or similar parts are denoted with same or similar reference numerals as in the first embodiment.

Figure 4:
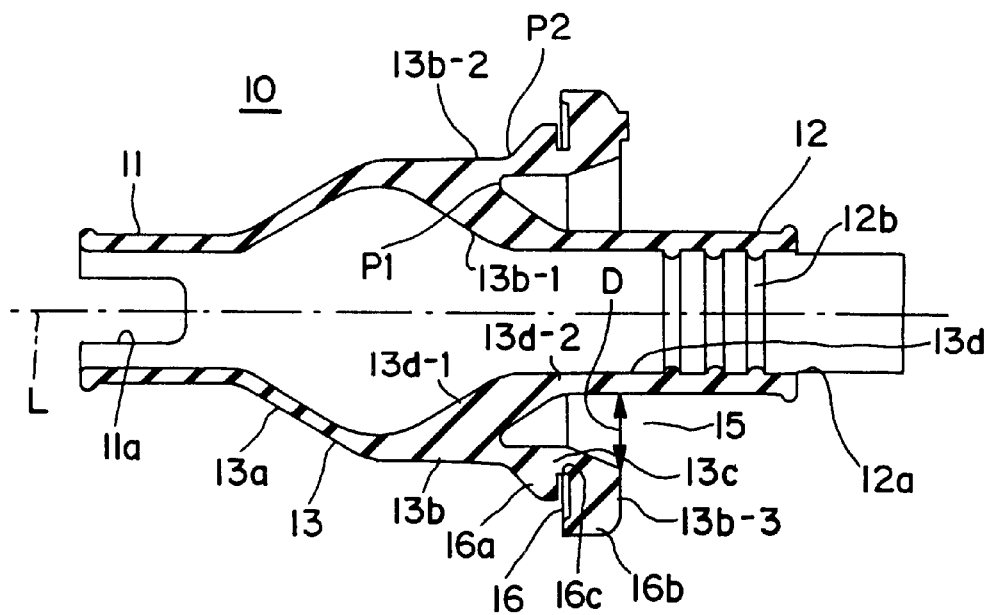
FIG. 4 is a section of a grommet according to a second embodiment of the invention.
Figure 5:
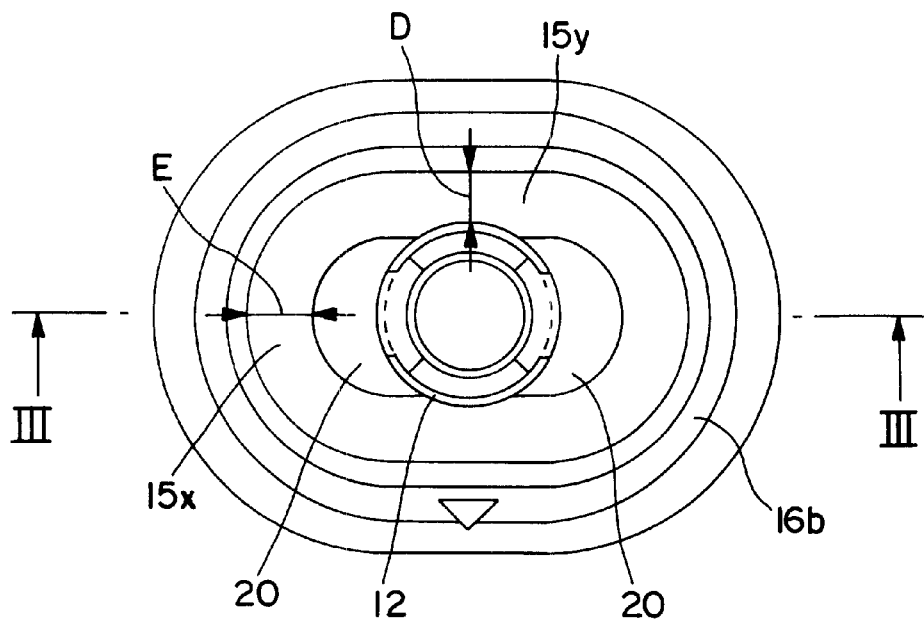
FIG. 5 is a right side view of the grommet.
Figure 6:
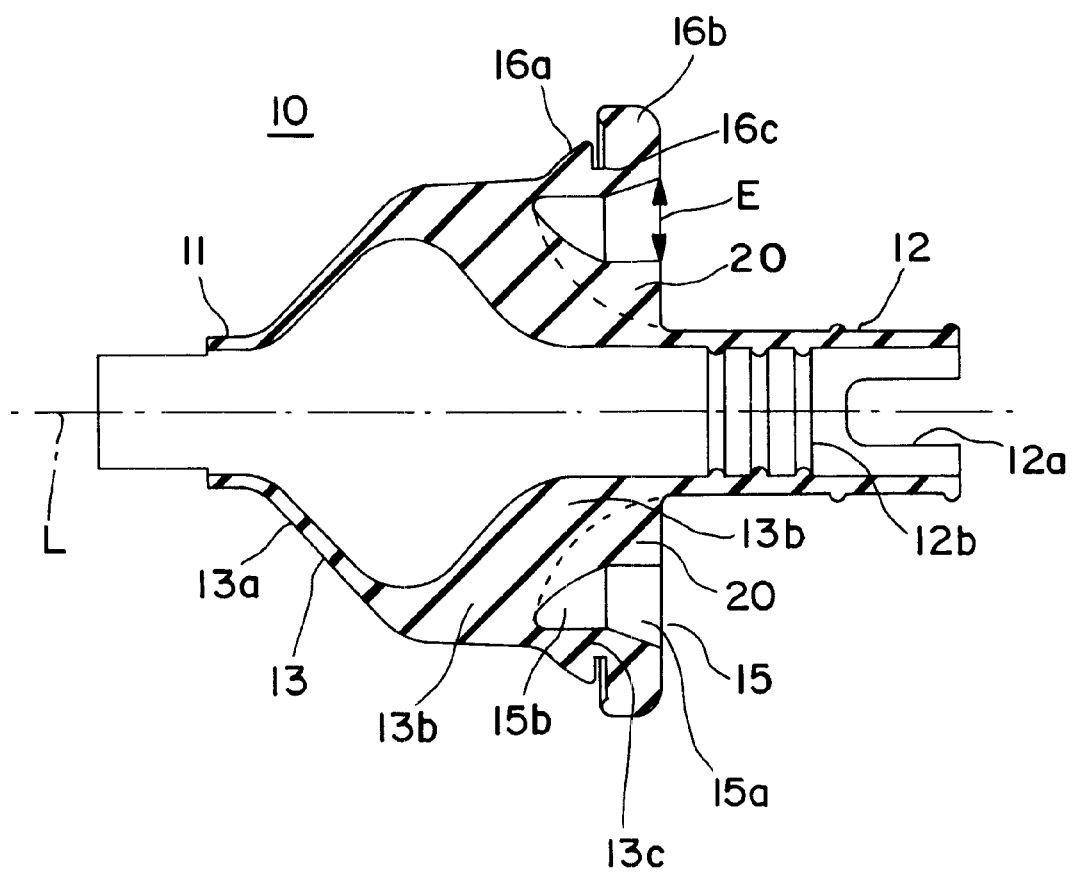
FIG. 6 is a section along III—III of FIG. 5.
Figure 7A:
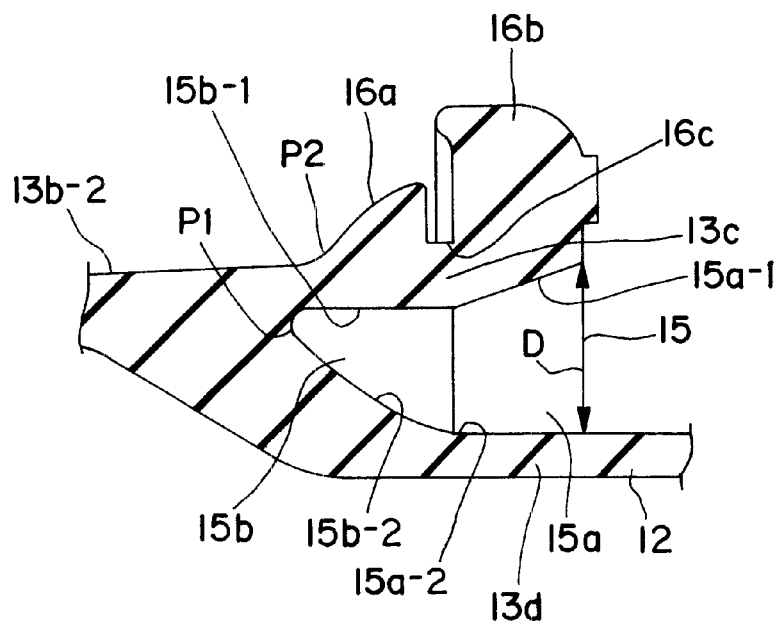
FIGS. 7(A) and 7(B) are enlarged sections showing a portion of the grommet.
Figure 7B:
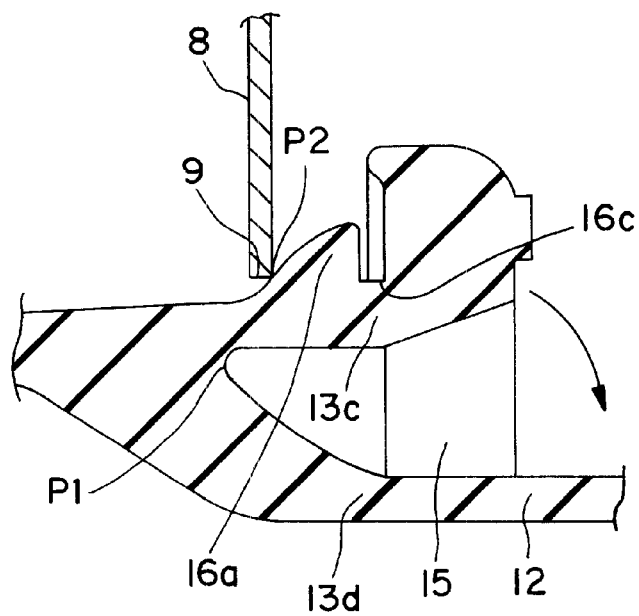

As shown in FIG. 4, the grommet 10 is formed integrally or unitarily of a resilient material, e.g. a rubber or elastomer, and has first and second small-diameter tubes 11, 12 disposed respectively at front and rear ends with respect to an insertion direction Q. The grommet 10 further has a widened tube 13 that is formed continuously between the first and second small-diameter tubes 11 and 12. A through hole formed in a body panel to be engaged with the grommet 10 is oblong. Thus, the widened tube 13 also is oblong.

Accordingly, since the inner tube 13d is circular and the outer tube 13c is oblong, clearances of the cut-away portion 15 at opposite sides 15x along a longer axis are larger, while clearances thereof at opposite sides 15y along a shorter axis are small.

Two projections 20 are formed on the outer circumferential surface of the inner tube 13d to provide substantially equal dimensions D for the clearances at the longer axis side and for the clearances E at the shorter axis side. The projections extend along substantially the entire length in longitudinal direction from the front end to the opening end of the cut-away portion 15. More particularly, a distance E between the projecting end of the projection 20 and the inner circumferential surface of the outer tube 13c is substantially equal to the dimension D between the inner and outer tubes 13d and 13c (D≅E). Further, the projecting distance of the projections 20 is larger at the opening end, so that the clearances E between the projections 20 and the outwardly widening outer tube can be a specified value or lower.

The dimensions D and E of the clearances are set such that the outer diameter of the vertical wall 16b is larger than the inner diameter of the through hole 9 of the body panel 8. Thus, it is impossible for the vertical wall 16b to pass through the through hole 9 even at the time of a maximum deformation where the outer tube 13c is inclined toward the cut-away portion 15. Specifically, the outer tube 13c contacts the outer circumferential surface of the inner tube 13d at the shorter axis side and contacts the projecting ends of the projections 20 at the longer axis side.

Figure 8:
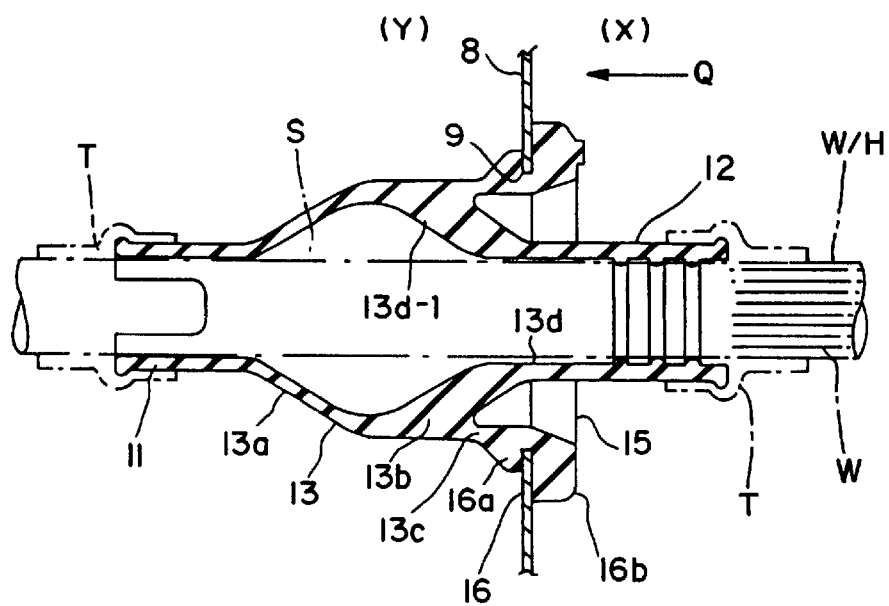
FIG. 8 is a section showing a mounted state of the grommet on a body panel.

The grommet 10 of the second embodiment is mounted similar to the grommet of the first embodiment. Thus, an operation of mounting the grommet 10 on the wiring harness W/H, as shown in FIG. 8, and pushing the grommet 10 into the through hole 9 in the body panel 8 from the engine compartment (X) to a passenger compartment (Y) is described.

The body panel 8 touches the slanted front surface of the annular front wall 16a during the insertion, and the inner tube 13d initially is deformed inwardly. The body panel 8 is brought into contact with the slanted front surface of the annular front wall 16a without deforming the outer tube 13c outwardly. Thus, the outer tube 13c is certain to deform inwardly so that the annular front wall 16a passes through the through hole 9.

The deformation of the outer tube 13c toward the cut-away portion 15 is restricted by the projections 20 even though the clearances at the longer axis side are large. The degree of deformation of portions of the outer tube 13c that contact the projections 20 is substantially the same as the maximum degree of deformation of the outer tube 13c at the shorter axis side. Even if the outer tube 13c is maximally deformed to contact the projections 20, the annular rear wall 16b does not pass through the through hole 9 because the outer diameter of the annular rear wall 16b is larger than the inner diameter of the through hole 9. As a result, the annular rear wall 16b can be brought into contact with a wall surface 9a at the insertion side of the body panel 8.

The annular front wall 16a is restored to its original shape after passing through the through hole 9 and cooperates with the annular rear wall 16b to hold the body panel 8 tightly. Thus, the grommet 10 is mounted on the body panel 8 with the inner circumferential surface of the through hole 9 held in contact with the bottom surface 16c.

The grommet 10 of the second embodiment can be locked by one pushing motion in one direction Q from the engine compartment (X) while being inserted into the through hole 9 formed in the body panel 8. The grommet 10 of the second embodiment functions in the same manner as the grommet 10 of the first embodiment if pulled from the passenger compartment.

Figure 9:
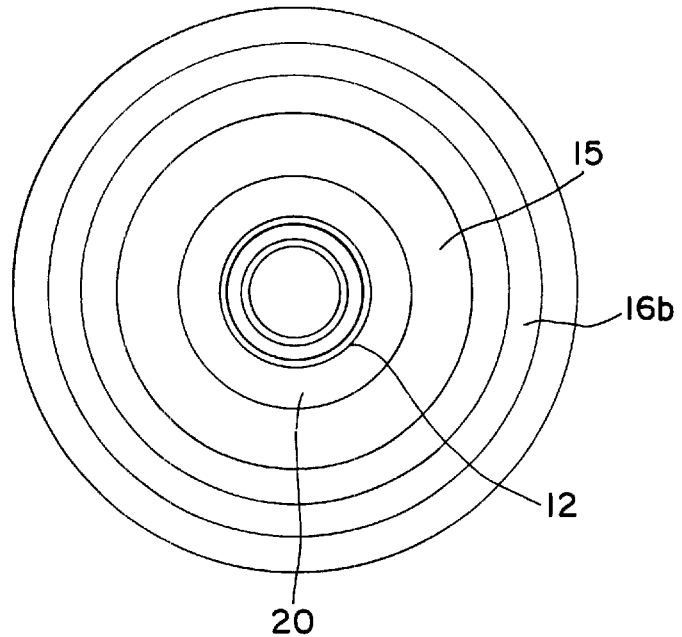
FIG. 9 is a right side view of a grommet according to a third embodiment of the invention.
Figure 10A:
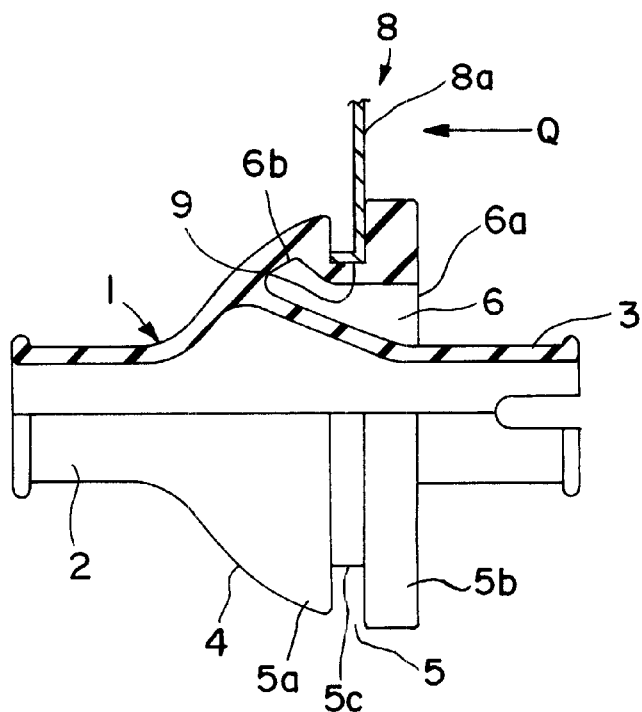
FIGS. 10(A) and 10(B) are sections showing a prior art grommet.
Figure 10B:
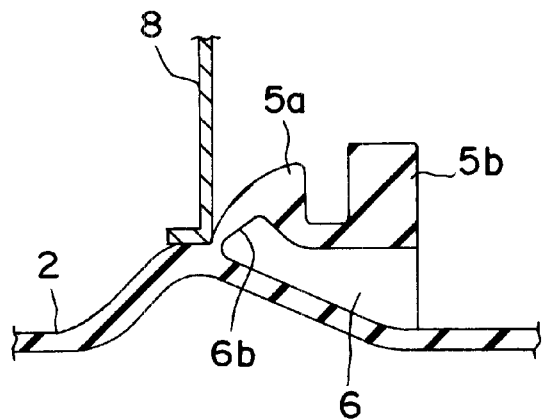

FIG. 9 shows a grommet 10' according to a third embodiment. The grommet 10' is used when the through hole of the body panel is circular. Thus, the widened tube 13 has circular ring shape and the outer tube 13c has a circular cross section. The cut-away portion 15 between the circular inner tube 13c and the outer tube 13c is constant over the entire circumference. However, an inclination preventing projection 20 is provided on the outer circumferential surface of the inner tube 13d over the entire circumference. This construction prevents an excessive inward inclination of the outer tube 13c that could otherwise permit the outer tube 13c to pass through the through hole during the insertion of the grommet into the through hole.

As in the first embodiment, the position of the cut-away portion of the grommet 10' is set more radially inward than the base end position of the annular front wall. Hence, the annular front wall of the grommet 10' is deformed inwardly in response to contact with the body panel. Thus, the slanted surface of the annular front wall never fails to be deformed toward the inner side of the cut-away portion, and the grommet pushing or pulling operation can be performed smoothly with a small insertion force.

The cut-away portion of the grommet 10' is widened at its opening side. Therefore, the outer tube with the annular front and rear walls that form the body locking recess can be deformed easily toward the cut-away portion. Therefore, the insertion force to mount the grommet can be reduced further.

Contact of the projection with the outer tube prevents an excessive inward deformation of the outer tube that might otherwise permit the grommet 10' to pass through the through hole of the body panel. In particular, the projections on the inner tube prevent the outer tube from being deformed excessively inwardly even if the through hole of the body panel and the cut-away portion of the grommet 10' are oblong and make clearances between the cut-away portion and the outer tube larger at the longer axis side. Therefore, the grommet 10' will not pass through the through hole without having the body locking recess being able to engage the body panel.

What is claimed is:

1. A grommet which is insertable into a through hole formed in a body panel in one direction for engagement with portions of the body panel adjacent the through hole, the grommet, prior to insertion into the through hole, comprising:
    front and rear small-diameter tubes provided at opposite front and rear ends of the grommet and having substantially equal diameters,
    a widened tube extending between the front and rear small-diameter tubes such that the front and rear small-diameter tubes extend forwardly and rearwardly beyond the widened tube, the widened tube having a diameter greater than the diameters of the front and rear small-diameter tubes,
    a cut-away portion extending forwardly into the widened tube, thereby branching the widened tube into an outer tube and an inner tube, the inner tube being substantially continuous with the rear small-diameter tube, the cut-away portion having a front end, and
    a body locking recess defined in an outer surface of the outer tube at a location rearward of the front end of the cut-away portion, the body locking recess having a radially innermost bottom portion, the front end of the cut-away portion being located more radial inwardly than the bottom portion of the body locking recess,
    whereby insertion of the front end of the grommet into the through hole urges the outer surface of the outer tube against the body panel and deforms portions of the outer tube adjacent the body locking recess inwardly toward the cut-away portion.

2. The grommet of claim 1, wherein the cut-away portion is formed to extend forward from a rear end surface of the widened tube.

3. The grommet of claim 1, wherein the body locking recess is defined by annular front and rear walls which project from an outer circumferential surface of a portion of the outer tube.

4. The grommet of claim 3, wherein the cut-away portion has an opening end defined by an inwardly and rearwardly facing inclined surface.

5. The grommet of claim 1, wherein a portion of the inner tube branched by the cut-away portion and continuous with the rear small-diameter tube is thinner than a base portion thereof branched from the outer tube.

6. A grommet which is insertable into a through hole formed in a body panel in one direction for engagement with portions of the body panel adjacent the through hole, comprising;
    front and rear small-diameter tubes provided at opposite front and rear ends of the grommet,
    a widened tube extending between the front and rear small-diameter tubes,
    a cut-away portion extending forwardly into the widened tube, thereby branching the widened tube into an outer tube and an inner tube, the inner tube being substantially continuous with the rear small-diameter tube, the cut-away portion having a front end, and
    a body locking recess defined in an outer surface of the outer tube at a location rearward of the front end of the cut-away portion, the body locking recess having a radially innermost bottom portion, the front end of the cut-away portion being located more radial inwardly than the bottom portion of the body locking recess
    an inclination preventing portion formed on an outer surface of the inner tube to limit inclination of the outer tube,
    whereby insertion of the front end of the grommet into the through hole urges the outer surface of the outer tube against the body panel and deforms portions of the outer tube adjacent the body locking recess inwardly toward the cut-away portion.

7. The grommet of claim 6, wherein the outer tube has an oblong cross section and the inner tube has a substantially circular cross section, the inclination preventing projection being provided on an outer circumferential surface of the inner tube corresponding to a longer axis side.

8. The grommet of claim 7, wherein the inclination preventing projection is provided so that a distance between a radially outer projecting end of the inclination preventing projection and an inner circumferential surface of the outer tube is substantially the same as a distance between the outer circumferential surface of the inner tube and the inner circumferential surface of the outer tube at a shorter axis side.

9. The grommet of claim 8, wherein the inclination preventing projection projects a longer distance at an opening end of the cut-away portion.

10. A grommet unitarily formed from an elastomeric material and comprising: opposite front and rear small-diameter tubes and a widened tube therebetween, a cut-away portion extending forwardly into the widened tube to a front end and branching the widened tube into an outer tube and an inner tube, the outer tube having an outer circumferential surface formed with front and rear walls defining a body locking recess therebetween, the body locking recess being rearward from the front end of the cut-away portion, the front end of the cut-away portion being located more radially inwardly than the body locking recess, an inclination preventing portion formed on an outer circumferential surface of the inner tube for limiting inclination of the outer tube.

11. The grommet of claim 10, wherein the front wall has a forwardly and outwardly facing slanted front surface.

12. The grommet of claim 10, wherein the rear wall projects outwardly further than the front wall.

13. The grommet of claim 10, wherein portions of the inner tube adjacent the second small-diameter tube are thinner than portions of the inner tube adjacent the outer tube.

14. The grommet of claim 10, wherein the outer tube has an oblong cross section and wherein at least a portion of the inner tube has a substantially circular cross section, the inclination preventing projection being provided on an outer circumferential surface of the inner tube corresponding to a longer axis side.

15. A grommet unitarily formed from an elastomeric material and comprising a front small diameter tube, a rear small diameter tube and a widened tube extending between the front and rear small diameter tubes, the front and rear small diameter tubes being concentrically generated about a longitudinal axis, the widened tube including a front portion flared outwardly from the front small diameter tube and a rear portion flared outwardly from the rear small diameter tube, the widened tube further comprising a large diameter portion extending between the front and rear portions of the widened tube, an outer tube projecting rearward from the large diameter portion of the widened tube such that a cut-away portion is defined between the outer tube and both the rear portion of the widened tube and portions of the rear small diameter tube adjacent the inner tube, said cut-away portion having a closed front end and an open rear end, front and rear walls projecting outwardly on said outer tube and defining a body locking recess therebetween, the front end of the cut-away portion being more forward than the body locking recess and being located more radially inwardly than the body locking recess the outer tube being substantially oblong and having a pair of opposed long sides and a pair of opposed short sides, projections extending outwardly from the inner tube at locations facing the short sides of the outer tube for limiting inward deflection of the short sides of the outer tube .

16. The grommet of claim 15, wherein the front wall has a forwardly and outwardly facing slanted front surface .

17. The grommet of claim 16, wherein the outer tube has an outer surface extending entirely around the grommet, the front and rear walls extending continuously around the outer surface of the outer tube.

* * * * *